United States Patent [19]

Wetterhorn

[11] 4,444,057
[45] Apr. 24, 1984

[54] MOVEMENT CONSTRUCTION FOR CONDITION RESPONSIVE GAUGE INSTRUMENT

[75] Inventor: Richard H. Wetterhorn, Fairfield, Conn.

[73] Assignee: Dresser Industries, Inc., Dallas, Tex.

[21] Appl. No.: 297,663

[22] Filed: Aug. 31, 1981

[51] Int. Cl.³ .............................................. G01L 7/04
[52] U.S. Cl. ................................... 73/739; 73/432 A; 73/732
[58] Field of Search ...................... 73/432 A, 739, 732, 73/738, 733, 734, 735, 736, 737, 740, 741, 742, 743, 744, 745, 746

[56] References Cited

U.S. PATENT DOCUMENTS

| | | | |
|---|---|---|---|
| 2,378,201 | 6/1945 | De Mair | 73/739 |
| 3,214,979 | 11/1965 | Bissell et al. | 73/418 |
| 3,661,027 | 5/1972 | Gattesco | 74/411 |
| 4,055,085 | 10/1977 | Wetterhorn | 73/418 |
| 4,246,796 | 1/1981 | Wetterhorn | 73/739 X |

FOREIGN PATENT DOCUMENTS

| | | | |
|---|---|---|---|
| 534662 | 3/1941 | United Kingdom | 73/732 |
| 566948 | 1/1945 | United Kingdom | 73/732 |

Primary Examiner—Gerald Goldberg
Assistant Examiner—Tom Noland
Attorney, Agent, or Firm—Daniel Rubin

[57] ABSTRACT

An improved movement construction for a condition responsive gauge instrument to transmit displacement motion with reduced backlash from a condition responsive element to an output drive. A first embodiment comprises a spring grip between the segment gear of the movement and the pivot actuator imposed by an integral wrap-around tail portion of the segment gear. A second embodiment comprises a second segment gear supported in parallel relation with the first segment gear and operative to impose a weighted relation on the pinion of the output drive. A third embodiment comprises a combination of the first and second embodiments.

7 Claims, 13 Drawing Figures

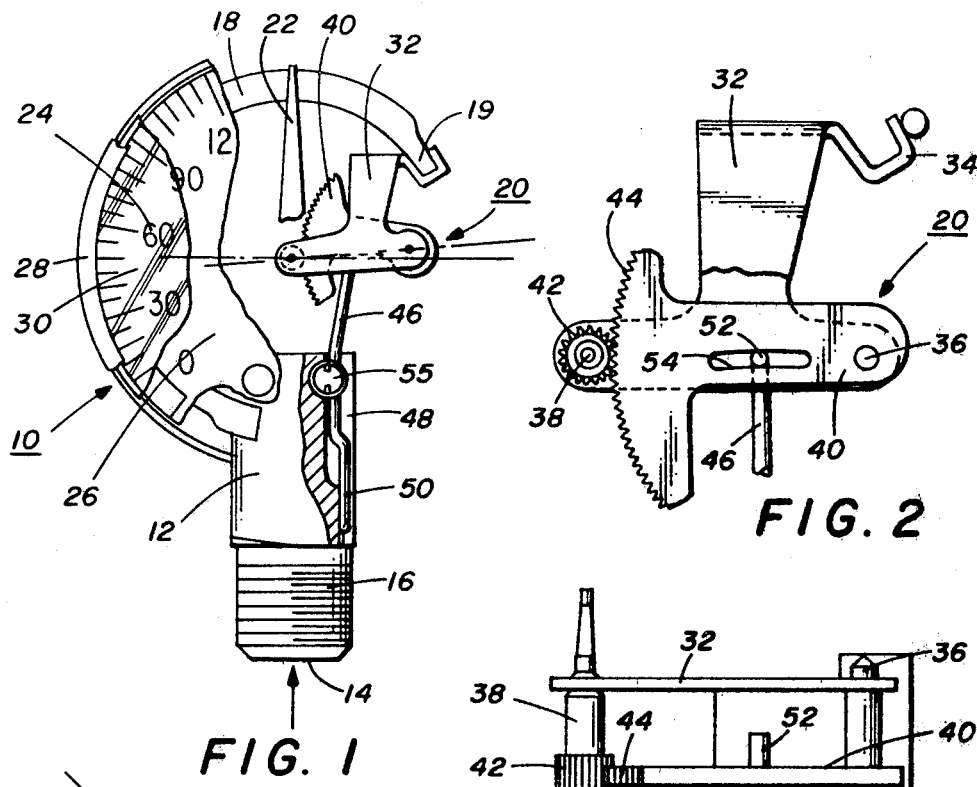
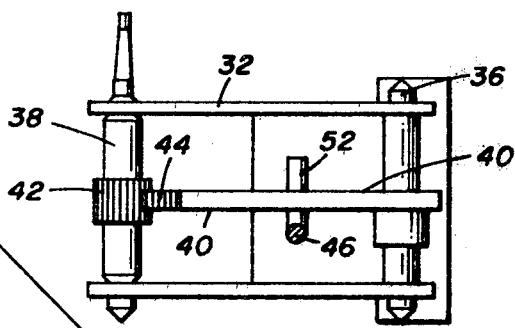
FIG. 1
FIG. 2
FIG. 3
PRIOR ART
(FIG. 1, FIG. 2, & FIG. 3)
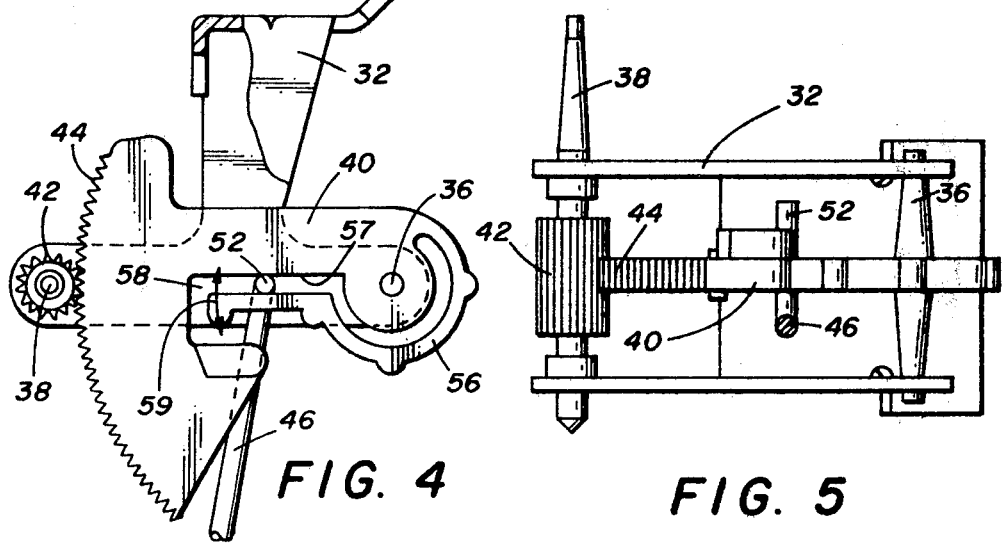
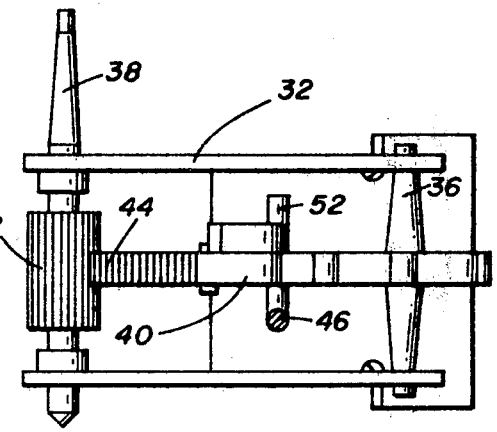
FIG. 4
FIG. 5

MOVEMENT CONSTRUCTION FOR CONDITION RESPONSIVE GAUGE INSTRUMENT

TECHNICAL FIELD

The technical field to which the invention pertains includes the art of measuring and testing as applicable to amplifier movements for condition responsive gauge instruments.

BACKGROUND OF THE INVENTION

Amplifier movements for use with pressure gauges, temperature gauges or the like are well known and have been used commerically for many years. Typically, such gauges have a condition responsive element comprised of a bellows, Bourdon tube, bi-metal coil or the like, providing correlated displacement motion in response to condition changes to which the element is sensitive and exposed. In a common construction, the amplifier or "movement" is comprised of leverage annd gearing operably responsive to displacement motion of the condition responsive element for driving an output shaft supporting a pointer movable relative to a fixed dial plate. The dial registration opposite the pointer position is indicative of the condition state such as pressure or temperature with which the instrument is being operated.

Disclosed in U.S. Pat. No. 4,055,085 to R. H. Wetterhorn is a pressure gauge in which the amplifier movement is supported on the free end of a Bourdon tube for floating conjointly with displacement of the tube end. A remotely connected actuator extending into the motion path of the floating amplifier defines a pivot axis for a hinged segment gear thereof. In pivoting about the actuator axis, the segment gear operably drives a pinion secured on the output shaft supporting the pointer.

Being that such gauge instruments are recognized for their precision of performance, operation accuracy is of paramount importance. Detracting from the intended accuracy, however, is the fact that the gauge movement, which is the heart of the instrument, constitutes a mechanical mechanism comprised of a plurality of geared and linkage components. Each of the individual components are subject to usual industry standards of manufacture that include tolerances which when assembled in operating relation results in a slack or backlash motion adversely affecting ultimate accuracy of the instrument. Traditionally, such instruments have employed a preloaded and subsequently adjusted coiled hair spring to reduce backlash motion in the movement occurring about the connecting linkage. On a low cost gauge, however, the hair spring represents a highly significant cost factor, while in addition can itself contribute adversely to performance accuracy of the gauge. That is, spring rate matching to load is critical in that if the hair spring rate is too low, it is unable to overcome inherent friction of the movement for elimination of the backlash. If too high, the excessive spring load can impose a pre-load friction which likewise detracts from performance accuracy of the gauge. Compounding the foregoing is the fact that spring load inherently varies in the course of winding and unwinding over the normal 270 degree angular displacement incurred by the usual gauge.

Another approach to overcoming the backlash problem of a gauge movement has been an unbalanced weighted construction disclosed, for example, in the Wetterhorn patent supra which relies on the weight of the segment gear, when supported in a vertical orientation, to eliminate all but the tooth-to-tooth clearance between pinion and segment. This approach has been successful in reducing inaccuracy attributed to the movement to within about two percent, but as can be appreciated, is substantially ineffective when the gauge movement is supported horizontally rather than vertically.

Despite recognition of the foregoing, a ready solution affording increased accuracy and/or more universal effectiveness in any support orientation of the instrument has not previously been known.

SUMMARY OF THE INVENTION

This invention relates to gauge instruments and more specifically to improved movement constructions therefor able to eliminate operational backlash more reliably and to a greater degree than heretofore. This is achieved in accordance with a first embodiment of the invention in which a spring grip between the segment gear and the pivot actuator is imposed by an integral wrap-around tail portion of the segment gear. In a second embodiment two unbalanced segment gears are utilized, one of which operates in a weighted relation in the manner of the prior art while a second segment gear supported parallel to the first provides a weighted drive for the takeup of pinion backlash. The latter is effective independent of the displacement motion being transmitted by the movement to eliminate backlash not only from the gear teeth but also from the shaft bearings, and does so at an essentially constant load. A third embodiment represents a combination of the first two embodiments to eliminate and/or reduce backlash in whatever gravitational orientation the movement is supported.

It is therefore an object of the invention to effect an improved movement construction for a gauge instrument able to minimize, if not eliminate, backlash effects thereof.

It is a further object of the invention to effect the previous object in a reliable and inexpensive manner so as to achieve greater instrument accuracy without imposing economic penalties on the overall cost of the gauge.

BRIEF DESCRIPTION OF THE DRAWINGS

FIG. 1 is a fragmentary front elevation of a pressure gauge in accordance with the prior art;

FIG. 2 is an enlarged front elevation view of the movement for the gauge of FIG. 1;

FIG. 3 is an underside view of FIG. 2;

FIG. 4 is a front elevation of a movement in accordance with a first embodiment of the invention;

FIG. 5 is an underside view of FIG. 4;

Figure 6:
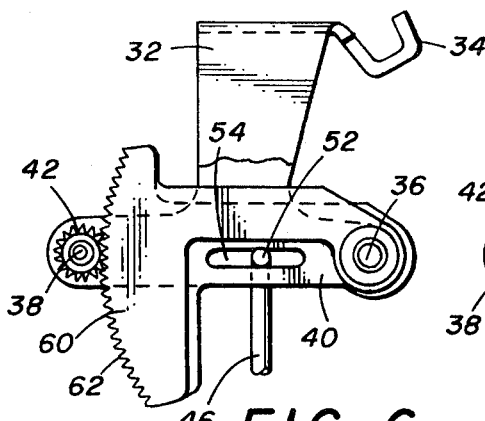
FIG. 6 is a front elevation view in accordance with a second embodiment of the invention.

Referring first to FIGS. 1-3, the prior art construction pressure gauge thereof is designated 10 and includes a stem or socket 12 in which fluid pressure to be sensed is received at an inlet 14. The socket includes threads 16 for connecting the gauge to a system with which it is to be employed. Fluid pressure received at inlet 14 is communicated to internally of a Bourdon tube 18 having a free end 19 that is subject to arcuate motion displacement in a well known manner in response to incremental pressure changes received at inlet 14. Displacement motion of tube end 19 is conducted via a movement amplifier 20 to produce correlated but amplified motion for operating a pointed 22 relative to pressure values 24 on dial face 26. Enclosing the gauge is a housing 28 supporting a transparent crystal 30 on its front side for viewing pointer operation.

Amplifier movement 20, as more completely disclosed in the Wetterhorn patent supra, is comprised of a central upright U-shaped carriage or frame 32 secured via a cupped bracket 34 to the displacement end 19 of Bourdon tube 18 as by welding, soldering, brazing or the like. Journal mounted in frame 32 are a pair of longitudinally displaced rotatable shafts 36 and 38, the former of which provides hinge support for a geared segment arm 40, while the latter constitutes the output drive shaft for operating pointer 22. Rotation of shaft 38 is effected by a pinion 42 secured thereon and driven by the meshing segment gear 44 of arm 40.

Affording operation of the amplifier is an actuator in the form of an elongated metal wire or link 46 extending from a stem recess 48 at which it is securely staked at 50. At its opposite end, actuator 46 includes an offset or crank bend 52 extending within an elongated slot 54 of segment arm 40 for defining the pivot axis therefor. An adjustable set screw 55 enables span setting of crank bend 52.

In accordance with the first embodiment of the invention as illustrated in FIGS. 4 and 5, the construction generally corresponds with that of previous FIGS. 1–3. In addition and unlike that of the prior art described above, segment arm 40, which preferably is of a molded plastic composition, includes an elongated wrap-around tail 56 extending integral therefrom. Previous slot 54 is eliminated and is provided for by means of tail 56 cooperating with the underside 57 of the segment arm to define an initial clearance 58 of dimension marginally less than the outside diameter of actuator bend 52. Because of its relative thinness and gradually bending profile from where it joins the segment arm, the distal portion of tail 56 has a spring-like quality in the direction of arrow 59 enabling actuator bend 52 to be received and retained in a spring grip within clearance 58 for defining the pivot axis thereat. Being that actuator bend 52 is securely held in a spring grip between the inside top edge surface of tail 56 and the underside edge surface 57 of arm 40, any previous clearance existing thereat is totally eliminated as is any backlash amplification therefrom previously contributing to error inaccuracy in the position of pointer 22.

Figure 7:
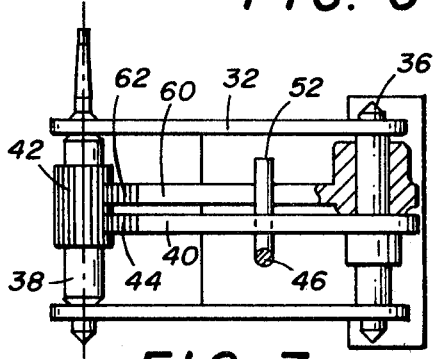
FIG. 7 is an underside view of FIG. 6.

For the second embodiment of FIGS. 6 and 7, the movement likewise corresponds generally with that of previous FIGS. 1–3, but unlike that construction includes a second segment arm 60 co-mounted with segment arm 40 on shaft 36. Arm 60, like arm 40, includes a segment gear 62 in mesh with pinion 42 but unlike arm 40 does not co-act with actuator bend 52, but instead imparts a weighted relationship in a counterclockwise direction (as illustrated) against pinion 42. The amount of weight moment required to be imposed by arm 60 need only be sufficient to overcome pinion friction so as to rotate or "rock" pinion 42 against segment gear 44. In this arrangement, segment 40 will, with the gauge vertically oriented tend to rest on the top of actuator bend 52. At the same time, segment 60 will in its tendency toward counterclockwise rotation, cause a clockwise drive of pinion 42 until all slack at the gearing, as well as at the journals for shafts 36 and 38, is eliminated.

Figure 8:
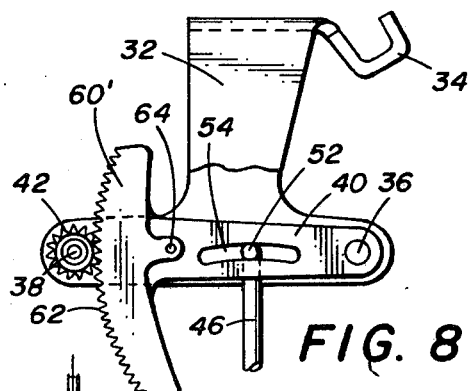
FIGS. 8 and 9 are front elevation and underside views, respectively, of an alternative construction for the second embodiment of the invention.
Figure 9:
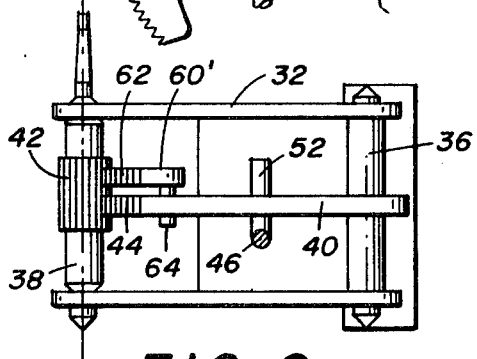

A structural variation of the second embodiment just described is illustrated in FIGS. 8 and 9 in which the weighted segment gear 60′ is of reduced mass and rather than being co-mounted with arm 40 on a common shaft 36 is separately mounted on a pin shaft 64 extending laterally through an aperture in arm 40.

Figure 10:
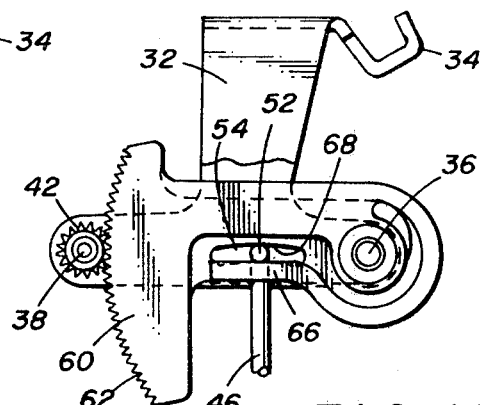
FIG. 10 is a front elevation view in accordance with a third embodiment of the invention.
Figure 11:
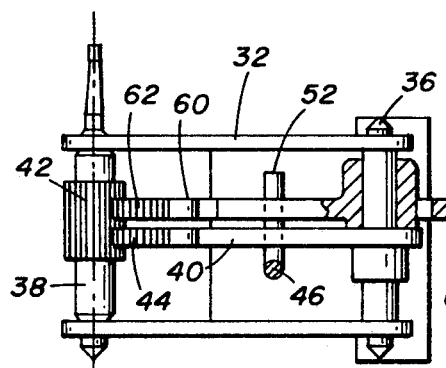
FIG. 11 is an underside view of FIG. 10.
Figure 12:
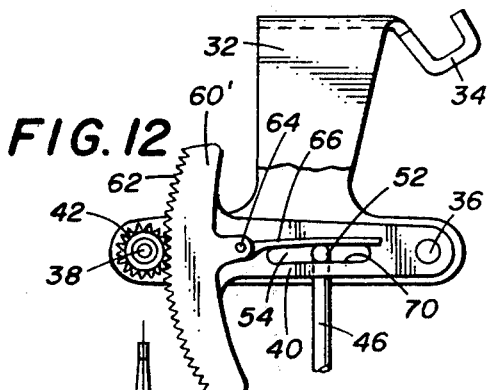
FIGS. 12 and 13 are front elevation and underside views, respectively, of an alternative construction for the third embodiment of the invention.
Figure 13:
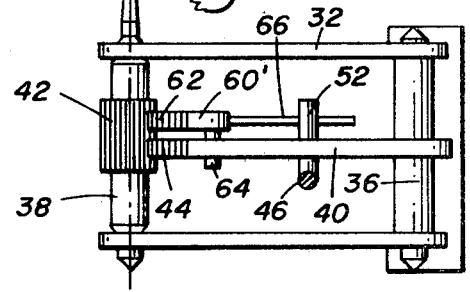

FIGS. 10 and 11 essentially represents a construction combining the previous embodiments of FIGS. 4 and 6, whereas the construction of FIGS. 12 and 13 essentially represent a combination of the previous embodiments of FIGS. 4 and 8. In each of these combination constructions an integral wrap-around tail 66, similar to tail 56 above, extends from the weighted segments 60 or 60′. Tail 66 in FIG. 10 engages the underside of actuator bend 52 so as to urge it upwardly in a spring grip against the upper edge 68 of slot 54 in arm 40. In FIG. 12 the force of tail 66 is downward urging bend 52 against lower edge 70 of slot 54.

By the above description there is disclosed novel construction for a movement in a gauge instrument whereby to reduce, if not eliminate, backlash caused by tolerance variations in the interfitting components thereof. With the dual segment second embodiment and the movement in a vertical orientation, all backlash produced by gear clearance and/or journal support for the shafts 36 and 38 is eliminated with a highly predictable and constant pre-load over the entire operating range of the gauge. By adding the use of the spring tail in the combination embodiments of FIGS. 10 or 12, any clearances about the pivot point are likewise eliminated such that the combination thereof is essentially totally effective with the movement positioned in a vertical orientation and is of greater effectiveness than the prior art when utilized with the movement in a horizontal orientation. The advantages hereof should be instantly recognized as overcoming the prior art problems of backlash in a simplified and economical manner for increasing accuracy of the gauge instruments.

Since many changes could be made in the above construction, and many apparently widely different embodiments of this invention could be made without departing from the scope thereof, it is intended that all matter contained in the drawings and specification shall be interpreted as illustrative and not in a limiting sense.

The embodiments of the invention in which an exclusive property or privilege is claimed are defined as follows:

1. In a movement for a gauge instrument operative to transmit displacement motion from a condition responsive element to a rotatable output shaft and comprising a segment arm defining a segment gear thereon and having a first connection for receiving an input displacement from the condition responsive element and a second connection displaced from said first connection for receiving axis means to define a pivot axis therefor and a pinion gear mounted on the output shaft and meshing with the segment gear to arcuately drive the output shaft concomitantly with pivotal motion incurred by the segment arm, the improvement comprising spring means extending from said segment arm and away therefrom to effect a spring bias urging at least one of said connections in a grip relation against the segment arm for substantially securing said at least one connection in position thereat.

2. In a movement according to claim 1 also including means adapted to support the movement for floating displacement conjointly with the displacement of the condition responsive element, said second connection is adapted to receive the distal end of a stationary actuator defining the pivot axis for said segment arm and the spring means of said improvement comprises means to secure the distal end of said actuator in a spring bias against said segment arm.

3. In a movement according to claim 2 in which said spring means comprises an elongated tail extending from said segment arm into a wrap-around juxtaposed relation with an edge surface of said segment arm for receiving the distal end of the actuator therebetween.

4. In a movement for a gauge instrument operative to transmit displacement motion from a condition responsive element to a rotatable output shaft and comprising a first segment arm defining a first segment gear thereon and having a first connection for receiving an input displacement from the condition responsive element and a second connection displaced from said first connection for receiving axis means to define a pivot axis therefor, a pinion gear mounted on the output shaft and meshing with said first segment gear to arcuately drive the output shaft concomitantly with pivotal motion incurred by said first segment arm, and a second segment arm defining a second segment gear thereon meshing with said pinion concomitantly with said first segment gear for imposing a weighted uni-directional drive relation against said pinion, the improvement comprising spring means extending from one of said segment arms and away therefrom to effect a spring bias urging at least one of said connections in a grip relation against said first segment for substantially securing said at least one connection in position thereat.

5. In a movement according to claim 4 in which second segment arm shaft is supported by extending transversely through said first segment arm at a location displaced for the shaft support of said first segment arm.

6. In a movement according to claim 4 also including means adapted to support the movement for floating displacement conjointly with the displacement of the condition responsive element, said second connection is adapted to receive the distal end of a stationary actuator defining the pivot axis for said first segment arm and the spring means of said improvement comprises means to secure the distal end of said actuator in said spring bias grip retation against said first segment arm.

7. In a movement according to claim 6 in which said spring means comprises an elongated tail extending from one of said segment arms into a wrap-around juxtaposed relation with an edge surface thereof for urging the actuator against the first of said segment arms.

* * * * *